July 7, 1959

F. A. LUNZER 2,893,287

MOTION PICTURE FILM DRIVE

Filed June 14, 1954

INVENTOR.
FREDRIC A. LUNZER

ATTORNEYS.

July 7, 1959
F. A. LUNZER
2,893,287
MOTION PICTURE FILM DRIVE
Filed June 14, 1954
2 Sheets-Sheet 2
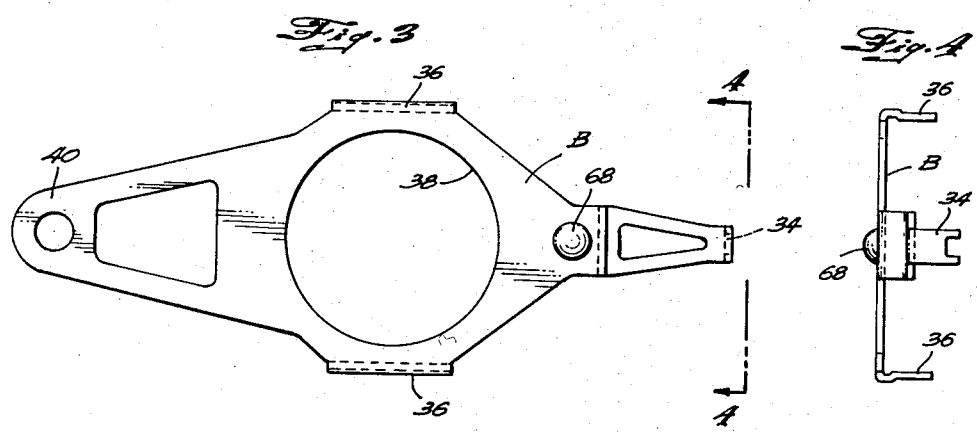
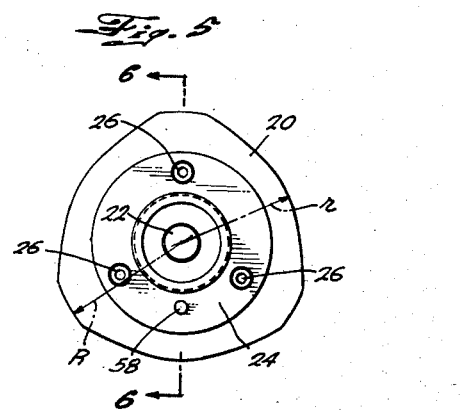
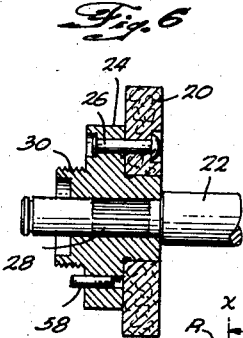
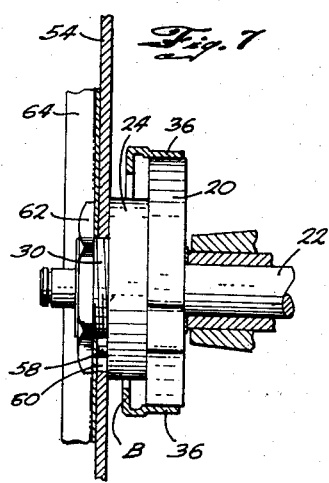
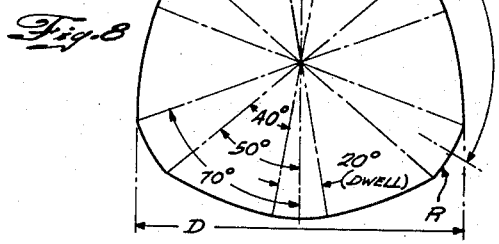
INVENTOR
FREDRIC A. LUNZER
ATTORNEYS.

United States Patent Office 2,893,287
Patented July 7, 1959

2,893,287

MOTION PICTURE FILM DRIVE

Fredric A. Lunzer, New York, N.Y., assignor to DeJur-Amsco Corporation, Long Island City, N.Y., a corporation of New York Application June 14, 1954, Serial No. 436,320

9 Claims. (Cl. 88—18.4)

The present invention relates to a motion picture film drive and more particularly to a film driving mechanism for a motion picture projector.

In one of the well known types of motion picture projector film drives, the film is intermittently driven or fed by means of a claw device which is movable in cycles as follows: transversely into film engagement position, longitudinally in one direction to effect the pulldown movement of the film the distance of one frame, transversely into a retracted film disengaged position and longitudinally in the reverse direction to lift or return the claw to its starting position.

For operating the claw device, it is customary to employ a uniform diameter cam which is active on the claw device to effect its pulldown and lift movements in this cycle, the film being fed during the pulldown in each such cycle and thus during each revolution of the cam shaft. The projected light beam is interrupted during the pulldown period by means of a shutter suitably timed with the action of the cam. The pulldown period forms a substantial part of such a cycle of operation, and hence results in a prolonged shut-off of the projected image and thus in a loss of the screening period of the film.

Many attempts have been made to improve such drive mechanism to reduce the effects of a prolonged shut-off of the projected image. A common method of doing so is to produce an accelerated pulldown of the film by running the cam shaft at a multiple speed, two, three or even more times faster than a single claw cycle requires, means being provided to cause the claw to skip the pulldown of the film every second camshaft revolution (where the cam shaft is run at double speed) or to skip two out of three camshaft revolutions (where the cam shaft is run at triple speed) and so on. A fast pulldown of the film with little loss of screening period is in this way achieved, but this requires running the cam shaft at high speeds, thus introducing other serious disadvantages.

The prime object of my present invention centers about the provision of a film drive in which the desired object of producing an accelerated or fast pulldown of the film is achieved at a normal camshaft speed, i.e., without the need for increasing the camshaft speed with its inherent disadvantages.

To the accomplishment of the foregoing object, and such other objects as may hereinafter appear, my invention relates to a motion picture film drive as sought to be defined in the appended claims taken together with the following specification and illustrated in the accompanying drawings, in which:

Fig. 3 is a plan view of the claw film feeding device used therein;

Fig. 4 is a side elevational view of the latter taken from the view of the plane of the line 4—4 of Fig. 3;

Fig. 5 is a front end view of the cam assembly of the film drive mechanism;

Fig. 6 is a section of the latter taken in the plane of the line 6—6 of Fig. 5;

Fig. 7 is a fragmentary view of the associated parts of the drive mechanism taken in the plane of the broken line 7—7 of Fig. 1; and Fig. 8 is an explanatory view of the cam forming part of the drive mechanism.

Figure 1:
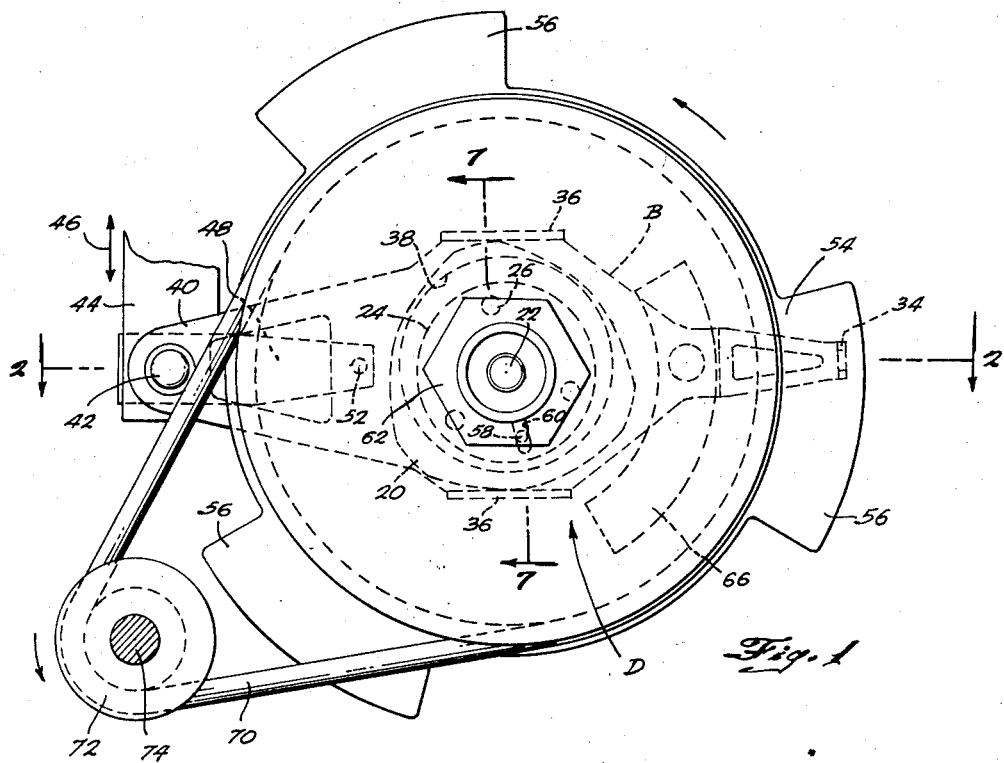
Fig. 1 is a front elevational view of the associated parts of the film driving mechanism of the present invention.
Figure 2:
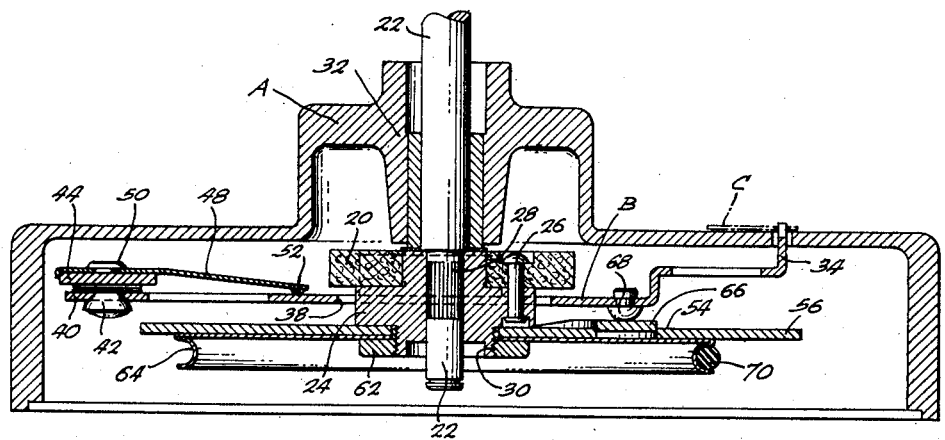
Fig. 2 is a view thereof taken in cross-section in the plane of the line 2—2 of Fig. 1.

Referring now more in detail to the drawings, and having reference first to Figs. 1 and 2 thereof where the inter-relation of the associated parts of the film drive mechanism is best shown in an assembled and supported state, the motion picture projector parts germane to the structure of the film drive comprise a housing support A, motion picture film feeding device B operative on for feeding the motion picture film C and a drive for the film feeding device generally designated as D. The housing support A is constructed to enclose and house the parts of the film feeding device B and its drive D and to suitably support the same.

The essence of the present invention derives from the provision, as part of the drive mechanism, of a uniform diameter multiple-action i.e. multiple tip cam which is active on the film feeding device B for imparting thereto a plurality of reciprocating cycles for each revolution of the cam, with means active on said feeding device B for moving the same into and out of engagement with the film during only one of said plurality of cycles for each revolution of the cam. More specifically, I provide a triple action or triple tip cam for imparting to the film feeding device three reciprocating cycles for each such revolution of the cam, the film being shifted or fed during only one of said three cycles for each such revolution of the cam. This cam is best shown in Figs. 5 and 8 of the drawings, and comprises a uniform diameter cam 20, the uniform diameter of which is indicated by the reference character D' (Fig. 8), the said cam being divided into three similar 120° sections, as illustrated in Fig. 8, each section having a short radius $r$ and a long radius R (the sum of which is equal to the uniform diameter D'). As will be clear from Figs. 5 and 8, this cam 20 has a triple repeat action for each revolution of the cam, there being three equal dwell periods of the cam each extending over an arc of 20°, the said dwell periods being equally spaced around the cam. As will be further noted, particularly from Fig. 8, the pulldown period of each action of the cam, as well as the lift period of each action of the cam, extends over an arc of 40°.

Structurally, the cam 20, which may be made of a suitable plastic, is fixedly connected to a cam shaft 22 by being press-fitted on to a metal hub 24 and further secured thereto by spaced rivets 26, the hub being, in turn, carried to a knurled portion 28 formed in the cam shaft 22. The hub is also threaded at its outer end 30. The cam shaft 22 is journaled for rotation in the supporting hub 32 forming part of the housing A.

This cam 20 is consequently active on the film feeding device B which latter is of the claw type. The film feeding claw B comprises a member provided at its operating end with a fingered claw 34 adapted to engage the motion picture film C at the film perforations thereof and provided at an intermediate section thereof with the upper and lower cam engaging flanges or lands 36, 36, the claw device being orificed at 38 to encircle and be freely movable with reference to the cam hub 24 (see Fig. 2). The said claw B is mounted for pivotal and reciprocating movement at the end 40 opposite the fingered claw 34 by means of a pivot rivet 42 on a bar 44 which bar is of well-known design, and which is mounted in the casing A for adjustment in a direction indicated by the arrows 46 (see Fig. 1), this adjustment being for framing purposes. The claw device B is spring biased to a retracted film disengaging position, this being accomplished by means of a spring 48 anchored at 50 to the bar 44 by means of the rivet 42 and spring active at 52 on the claw device B.

By means of the construction thus far described it will be seen that on each revolution of the cam shaft 22 and the cam 20 fixed thereto three reciprocating cycles of pull down and lift are imparted to the claw device B effective by the engagement of the flanges or lands 36, 36, and their follower action on the three cycle sections of the cam 20.

However, it is only with reference to one of these three cycles for each such revolution of the cam that the film feeding claw B is effective for feeding the film. This latter is accomplished by the provision of a translateral cam active transversely on the film feeding claw for moving the same into and out of engagement with the film during only one of the three referred to cycles. This translateral action is preferably accomplished in a simple way by the provision of a cam element on the film shutter associated with the film drive.

The film shutter for obscuring the shift of the film in the intermittent feeding of the latter (constructed also to eliminate flicker) comprises a shutter 54 having three equally spaced shuttering blades 56, 56, the said shutter being secured to the cam shaft 22 by a simple pin 58 and slot 60 engagement, the said shutter being fixed in position by means of a nut 62 threaded on to the threaded end 30 of the hub 24, a driven pulley or sheave 64 being at the same time secured in place by the same means. With this construction the film shutter is operable at a cycle speed of the same order of magnitude, and preferably at the same speed by reason of its being fixed to the cam shaft, as the speed of revolution of the cam shaft. The translateral cam element for operating the clam device B, as described, is preferably provided by forming or striking out an arcuate section 66 from the material of the shutter 54 (see Figs. 1 and 2), this section being arranged to engage a button 68 fitted to the claw device B. With the provision of this mechanism it will be seen that during each revolution of the cam shaft 22 (and the shutter 54) the translateral cam section 66 will engage only once the button 68 of the claw device B to move the same, as shown in Figs. 1 and 2 of the drawings, and to engage with the film C and to hold the same in such engagement during a pulldown period of one of the three cam cycles. The translateral cam element 66 is made of an arcuate extent and is divided into rise, high and fall sections (best indicated in Fig. 2) so as to accomplish the transverse movements of the claw device B into film engagement and back into a retracted film disengaging position, the latter movement being assisted by the bias spring 48.

For operating the parts of the film driving mechanism the pulley or sheave 64, previously referred to, is employed, and the same is connected by means of a belt 70 to a driving pulley 72 which, in turn, is connected to a motor-operated shaft 74.

The use and operation of the motion picture film drive of the present invention will, in the main, be fully apparent from the above detailed description thereof. With the employment of the multiple-action cam described, a fast or accelerated pulldown or film shift, as desired, is produced with the use of a normal cam shaft speed. The design of the apparatus described makes it also possible to have the advantage of a harmonic cam action which is beneficial to the preservation of the film. In the preferred structure exemplified herein only one of three pulldown periods of the cam is used for shifting or feeding the film, and the translateral cam which provides for by-passing the film by the claw over two out of the three pulldowns per cam shaft revolution is conveniently made an integral part of the shutter blade, thus producing a very simple and compact assembly. All of the advantages of a double action cam are achieved at a basic running speed of a "single action" arrangement, while still enjoying the benefit of a harmonic cam design.

It will be apparent that many changes may be made in the structure of the film drive described without departing from the spirit of the invention defined in the following claims.

I claim:

1. A motion picture film drive comprising a movable film feeding device, a uniform diameter multiple-tip rotatable cam active on the film feeding device for imparting thereto a plurality of reciprocating cycles for each revolution of the cam, means active on the film feeding device for moving the same into and out of engagement with the film during only one of said plurality of cycles for each such revolution of the cam, a movable film shutter operable at a cycle speed of the same order of magnitude as the speed of revolution of the cam, and mechanism for synchronously operating said cam, said shutter and said means.

2. A motion picture film drive comprising a movable film feeding device, a uniform diameter multiple-tip rotatable cam active on the film feeding device for imparting thereto a plurality of reciprocating cycles for each revolution of the cam, means including a cam active transversely on the film feeding device for moving the same into and out of engagement with the film during only one of said plurality of cycles for each such revolution of the cam, a movable film shutter operable at a cycle speed of the same order of magnitude as the speed of revolution of the cam, and mechanism for synchronously operating said cam, said shutter and said means.

3. A motion picture film drive comprising a movable film feeding device, a drive shaft, a uniform diameter multiple-tip cam fixed to the shaft and active on the film feeding device for imparting thereto a plurality of reciprocating cycles for each revolution of the shaft, a film shutter fixed to said shaft, means including an element on said shutter active on the film feeding device for moving the same into and out of engagement with the film during only one of said plurality of cycles for each such revolution of the shaft, and mechanism for rotating said shaft.

4. A motion picture film drive comprising a movable film feeding device, a drive shaft, a uniform diameter multiple-tip cam fixed to the shaft and active on the film feeding device for imparting thereto a plurality of reciprocating cycles for each revolution of the shaft, a film shutter fixed to said shaft, means including a cam element on said shutter active on the film feeding device for moving the same into and out of engagement with the film during only one of said plurality of cycles for each such revolution of the shaft, and mechanism for rotating said shaft.

5. A motion picture film drive comprising a movable film feeding device, a drive shaft, a uniform diameter triple-tip cam fixed to the shaft and active on the film feeding device for imparting thereto three reciprocating cycles for each revolution of the shaft, a film shutter fixed to said shaft, means including a cam element on said shutter active on the film feeding device for moving the same into and out of engagement with the film during only one of said plurality of cycles for each such revolution of the shaft, and mechanism for rotating said shaft.

6. A motion picture film drive comprising a movable film feeding claw, a drive shaft, a uniform diameter multiple-tip cam fixed to the shaft and active on the film feeding claw for imparting thereto a plurality of reciprocating cycles for each revolution of the shaft, a film shutter fixed to said shaft, spring biasing means for urging said film feeding claw to a film retracted position, means on said shutter active on the film feeding claw for moving the same against said spring biasing means into engagement with the film during only one of said plurality of cycles for each such revolution of the shaft, and mechanism for rotating said shaft.

7. A motion picture film drive comprising a movable film feeding claw, a drive shaft, a uniform diameter triple-tip cam fixed to the shaft and active on the film feeding claw for imparting thereto three reciprocating cycles for each revolution of the shaft, a film shutter fixed to said shaft, spring biasing means for urging said film feeding claw to a film retracted position, a cam element on said shutter active on the film feeding claw for moving the same against said spring biasing means into engagement with the film during only one of said three cycles for each such revolution of the shaft, and mechanism for rotating said shaft.

8. A motion picture film drive comprising a movable film feeding device, a uniform diameter multiple-tip rotatable cam active on the film feeding device for imparting thereto a plurality of reciprocating cycles for each revolution of the cam, means active on the film feeding device for moving the same into and out of engagement with the film during only one of said plurality of cycles for each such revolution of the cam, a rotatable film shutter rotatable at the same speed of revolution as the cam, and mechanism for synchronously operating said cam, said shutter and said means.

9. A motion picture film drive comprising a movable film feeding device, a drive shaft, a uniform diameter multiple-tip cam fixed to the shaft and active on the film feeding device for imparting thereto a plurality of reciprocating cycles for each revolution of the shaft, a film shutter fixed to said shaft and thereby rendered rotatable at the same speed of revolution as that of the cam, means active on the film feeding device for moving the same into and out of engagement with the film during only one of said plurality of cycles for each such revolution of the shaft, and mechanism for synchronously operating said cam shaft and said means.

References Cited in the file of this patent

UNITED STATES PATENTS

| 2,378,416 | Like | June 19, 1945 |
| 2,420,444 | Ress | May 13, 1947 |
| 2,605,674 | Bouma | Aug. 5, 1952 |

FOREIGN PATENTS

| 451,395 | Germany | Oct. 26, 1927 |